US010291651B1

(12) United States Patent
Chaubey (10) Patent No.: US 10,291,651 B1
(45) Date of Patent: *May 14, 2019

(54) UNIFIED SECURE SOCKET LAYER DECRYPTION

(71) Applicant: Juniper Networks, Inc., Sunnyvale, CA (US)

(72) Inventor: Rajeev Chaubey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,409

(22) Filed: Jun. 26, 2015

(51) Int. Cl.
H04L 29/06 (2006.01)

(52) U.S. Cl.
CPC ........ *H04L 63/168* (2013.01); *H04L 63/0428* (2013.01); *H04L 63/062* (2013.01); *H04L 63/08* (2013.01); *H04L 63/0823* (2013.01); *H04L 63/20* (2013.01)

(58) Field of Classification Search
CPC ........ H04L 63/168; H04L 63/08; H04L 63/04
See application file for complete search history.

(56) References Cited

U.S. PATENT DOCUMENTS

| | | | |
|---|---|---|---|
| 6,978,367 B1 | 12/2005 | Hind | |
| 7,290,133 B1 | 10/2007 | Montgomery | |
| 7,536,544 B2 | 5/2009 | Xiao | |
| 7,739,744 B2 | 6/2010 | Burch et al. | |
| 8,032,742 B2 | 10/2011 | Bergerson et al. | |
| 8,438,618 B2 | 5/2013 | Eldar | |
| 8,549,300 B1 | 10/2013 | Kumar | |
| 8,615,795 B2 | 12/2013 | Cottrell | |
| 8,869,259 B1 | 10/2014 | Udupa et al. | |
| 8,996,873 B1 | 3/2015 | Pahl et al. | |
| 9,338,147 B1 | 5/2016 | Rothstein et al. | |
| 9,397,839 B2 | 7/2016 | Thoniel | |
| 9,462,006 B2 | 10/2016 | Uzun | |
| 9,774,452 B2 | 9/2017 | Bjarnason | |
| 9,893,883 B1 | 2/2018 | Chaubey et al. | |
| 2003/0074584 A1 | 4/2003 | Ellis | |
| 2005/0278534 A1 | 12/2005 | Nadalin | |
| 2006/0095388 A1 | 5/2006 | Brown | |

(Continued)

OTHER PUBLICATIONS https://live.paloaltonetworks.com/t5/Learning-Articles/Difference-Between-SSL-Forward-Proxy-and-Inbound-Inspection/ta-p/55553, Oct. 16, 2013 3 pages.*

(Continued)

*Primary Examiner* — Wasika Nipa
(74) *Attorney, Agent, or Firm* — Harrity & Harrity, LLP (57) ABSTRACT

A device may receive a message associated with initiating a secure socket layer session or a transport layer security session (SSL/TLS session). The device may identify a decryption profile associated with managing encrypted traffic associated with the SSL/TLS session. The device may determine a server indicator included in the message. The device may determine whether the decryption profile includes information associated with the server indicator. The device may selectively manage the encrypted traffic associated with the SSL/TLS session using a first decryption technique or a second decryption technique based on determining whether the decryption profile includes information associated with the server indicator, where the first decryption technique may be different from the second decryption technique.

20 Claims, 7 Drawing Sheets

(56) References Cited

U.S. PATENT DOCUMENTS

| | | |
|---|---|---|
| 2012/0005746 A1 | 1/2012 | Wei |
| 2012/0166806 A1 | 6/2012 | Zhang |
| 2012/0226900 A1* | 9/2012 | Rodgers .................. G06F 21/10 |
| | | 713/150 |
| 2012/0246475 A1 | 9/2012 | Yoo et al. |
| 2013/0198511 A1 | 8/2013 | Yoo |
| 2013/0318343 A1 | 11/2013 | Bjarnason |
| 2014/0040637 A1 | 2/2014 | Hameed et al. |
| 2014/0304499 A1 | 10/2014 | Gopinath |
| 2015/0068338 A1 | 3/2015 | Gero |
| 2015/0172064 A1 | 6/2015 | Takenaka |
| 2016/0119318 A1 | 4/2016 | Zollinger et al. |
| 2016/0119374 A1* | 4/2016 | Williams ............ H04L 63/1441 |
| | | 713/175 |
| 2016/0226827 A1 | 8/2016 | Bohannon |
| 2017/0048714 A1 | 2/2017 | Attfield |

OTHER PUBLICATIONS

Palo Alto Networks, "Decryption," Pan-OS Administrator's Guide Version 6.1, May 13, 2015, 30 pages.
Wikipedia, "Server Name Indication," http://en.wikipedia.org/wiki/Server_Name_Indication, May 15, 2015, 7 pages.
Blue Coat, "Technology Primer: Secure Sockets Layer (SSL)", Blue Coat Systems, Inc., 2008, 22 pages.
Wikipedia, "Forward secrecy," http://en.wikipedia.org/wiki/Forward_secrecy, May 9, 2015, 4 pages.
Scott Helme, "Perfect Forward Secrecy—An Introduction", https://scotthelme.co.uk/perfect-forward-secrecy/, May 10, 2014, 7 pages.
Komar et al., "Troubleshooting Certificate Status and Revocation", Microsoft Corporation Nov. 1, 2003 (Year: 2003), 53 pages.

* cited by examiner

UNIFIED SECURE SOCKET LAYER DECRYPTION

RELATED APPLICATIONS

This application relates to U.S. patent application Ser. No. 14/751,332, filed on Jun. 26, 2015, and U.S. patent application Ser. No. 14/751,605, filed on Jun. 26, 2015 and entitled "Decryption of Secure Sockets Layer Sessions Having Enabled Perfect Forward Secrecy Using a Diffie-Hellman Key Exchange," the contents of which are incorporated by reference herein in their entirety.

BACKGROUND

Secure Socket Layer (SSL) and Transport Layer Security (TLS) are cryptographic protocols designed to provide communications security over a communication network. SSL and TLS may use asymmetric cryptography to authenticate devices associated with the secure communications and/or to negotiate a symmetric key associated with encrypting traffic between the devices.

SUMMARY

According to some possible implementations, a method may comprise: receiving, by a device, a message associated with initiating a secure session; identifying, by the device, a decryption profile associated with managing encrypted traffic associated with the secure session; identifying, by the device, a server indicator included in the message; determining, by the device, whether the decryption profile includes information associated with the server indicator; and based on determining that the decryption profile does not include information associated with the server indicator: selectively managing, by the device, the encrypted traffic, associated with the secure session, using a first decryption technique or a second decryption technique based on determining whether the decryption profile includes information associated with the server indicator, where the first decryption technique may be different from the second decryption technique.

According to some possible implementations, a device may comprise one or more processors to: receive a message associated with initiating a secure socket layer session or a transport layer security session (SSL/TLS session); identify a decryption profile associated with managing encrypted traffic associated with the SSL/TLS session; determine a server indicator included in the message; determine whether the decryption profile includes information associated with the server indicator; and selectively manage the encrypted traffic associated with the SSL/TLS session using a first decryption technique or a second decryption technique based on determining whether the decryption profile includes information associated with the server indicator, where the first decryption technique may be different from the second decryption technique.

According to some possible implementations, a computer-readable medium may store instructions that, when executed by one or more processors, cause the one or more processors to: analyze a message associated with initiating a secure socket layer session or a transport layer security session (SSL/TLS session) between a client device and a server device; identify a decryption profile for managing encrypted traffic associated with the SSL/TLS session; determine a server indicator included in the message, an identifier associated with the server device, or a network address associated with the message; determine whether the decryption profile identifies a server certificate and a corresponding server private key associated with the server indicator, the identifier, or the network address; and manage the encrypted traffic, associated with the SSL/TLS session, using a SSL forward proxy technique based on determining that the decryption profile does not include the server certificate and the corresponding server private key; or manage the encrypted traffic, associated with the SSL/TLS session, using a SSL inbound inspection technique based on determining that the decryption profile includes the server certificate and the corresponding server private key.

DETAILED DESCRIPTION

The following detailed description of example implementations refers to the accompanying drawings. The same reference numbers in different drawings may identify the same or similar elements.

A security device may host a firewall associated with managing (e.g., inspecting, processing, monitoring, etc.) traffic provided by and/or destined for a client device and/or a server device. In some implementations, the client device may be capable of initiating a secure session with the server device to allow the traffic to be encrypted (e.g., for security purposes, for privacy purposes, etc.). For example, the client device may be capable of initiating a SSL session or a TLS session (SSL/TLS session) with the server device. As such, the security device may need to be capable of decrypting the encrypted traffic in order to inspect the traffic and enforce a security policy associated with the secure session.

In some implementations, the security device may be capable of using multiple, different types of decryption techniques to manage the encrypted traffic associated with the secure session. For example, the security device may be capable of using a SSL forward proxy technique in order to manage encrypted traffic associated with a secure session. When implementing the SSL forward proxy technique, the security device may split the secure session in two and act as a man-in-the-middle (e.g., between the client device and the server device). Here, the security device may acts as a server device to the client device and may terminate the SSL/TLS session on the client side. The security device may also act as a client device and initiate an SSL/TLS session with the server device. When the security device receives a server certificate (e.g., during an SSL/TLS handshake), the security device may replace a public key, associated with the server device and on the server certificate, with a public key associated with the security device. The security device may then sign the server certificate using certificate authority details configured on the security device. The security device may then act as a server device and forward the certificate, including the public key associated with the security device, to the client device. The client device may then generate a master key for the SSL/TLS session and encrypt the master key using the public key, associated with the security device, that was included in the server certificate. Here, since the security device has attached its own public key on the server certificate, the security device may have access to corresponding private key and may decrypt the encrypted master key. Using the master key, the security device may generate a session key and use the session key to decrypt traffic associated with the SSL/TLS session. The SSL forward proxy technique may be implemented in a case where the server device is not known to the security device.

As another example, the security device may be capable of using a SSL inbound inspection technique in order to manage encrypted traffic associated with the secure session. In this case, the security device may store or have access to a private key associated with the server device and corresponding to the server public key. Here, when the client device encrypts the master key using the server public key, the security device may decrypt the encrypted master key using the server private key. The security device may then decrypt traffic using the master key without acting as a man-in-the-middle of the SSL/TLS session. The SSL inbound inspection technique may be implemented in a case where the server device is known to the security device, and may be considerably faster than the SSL forward proxy technique when managing the encrypted traffic and use substantially fewer processing resources and/or memory resources. Moreover, when using the SSL inbound inspection technique, the security device need not participate in a handshake procedure associated with establishing the SSL/TLS session. Rather, the handshake procedure may take place between the client device and the server device only (i.e., without intervention by the security device). However, the security device may be able to examine messages exchanged between the client device and the server device since the security device may have access to a server private key and, thus, may be able to decrypt the master key for the session.

In some implementations, the decryption technique to be used by the security device to manage the encrypted traffic may be identified in a decryption profile. The decryption profile may include information associated with managing encrypted traffic for a secure session, such as information that identifies a decryption technique that is to be used to manage the encrypted traffic. In some implementations, the decryption profile may be identified based on an association with a firewall rule to be applied to the encrypted traffic. For example, the security device may store or have access to a set of firewall rules for managing traffic associated with the client device, where each firewall rule may be associated with a corresponding decryption profile that includes information associated with managing encrypted traffic. Here, upon identifying an applicable firewall rule with which traffic is to be managed, the security device may determine the decryption profile associated with managing the encrypted traffic. In some implementations, a single decryption profile may be associated with multiple firewall rules.

However, each decryption profile may need to explicitly identify a particular decryption technique with which the security device is to manage the encrypted traffic associated with the secure session. In other words, the decryption profile may only allow the security device to use a single decryption technique when the security device identifies the decryption profile. In some cases, the static nature of the decryption profile may lead to an increased use of resources by the security device when managing the encrypted traffic. For example, since the SSL forward proxy technique may consume a greater amount of processing resources, memory resources, or the like, than the SSL inbound inspection technique, the static nature of the decryption profile may lead to an increased consumption of such resources when the decryption profile identifies the SSL forward proxy technique as the decryption technique to be used to manage the encrypted traffic.

Implementations described herein may allow a security device to dynamically identify a decryption technique to be used to manage encrypted traffic associated with a secure session. In this way, a single decryption profile, associated with managing encrypted traffic, may be used to implement multiple, different decryption techniques, which may lead to simplified configuration of the security device. Moreover, the ability to dynamically identify the decryption technique may improve efficiency in terms of computing resources consumed by the security device when, for example, a less computationally expensive decryption technique may be identified for use in managing the encrypted traffic.

Figure 1:
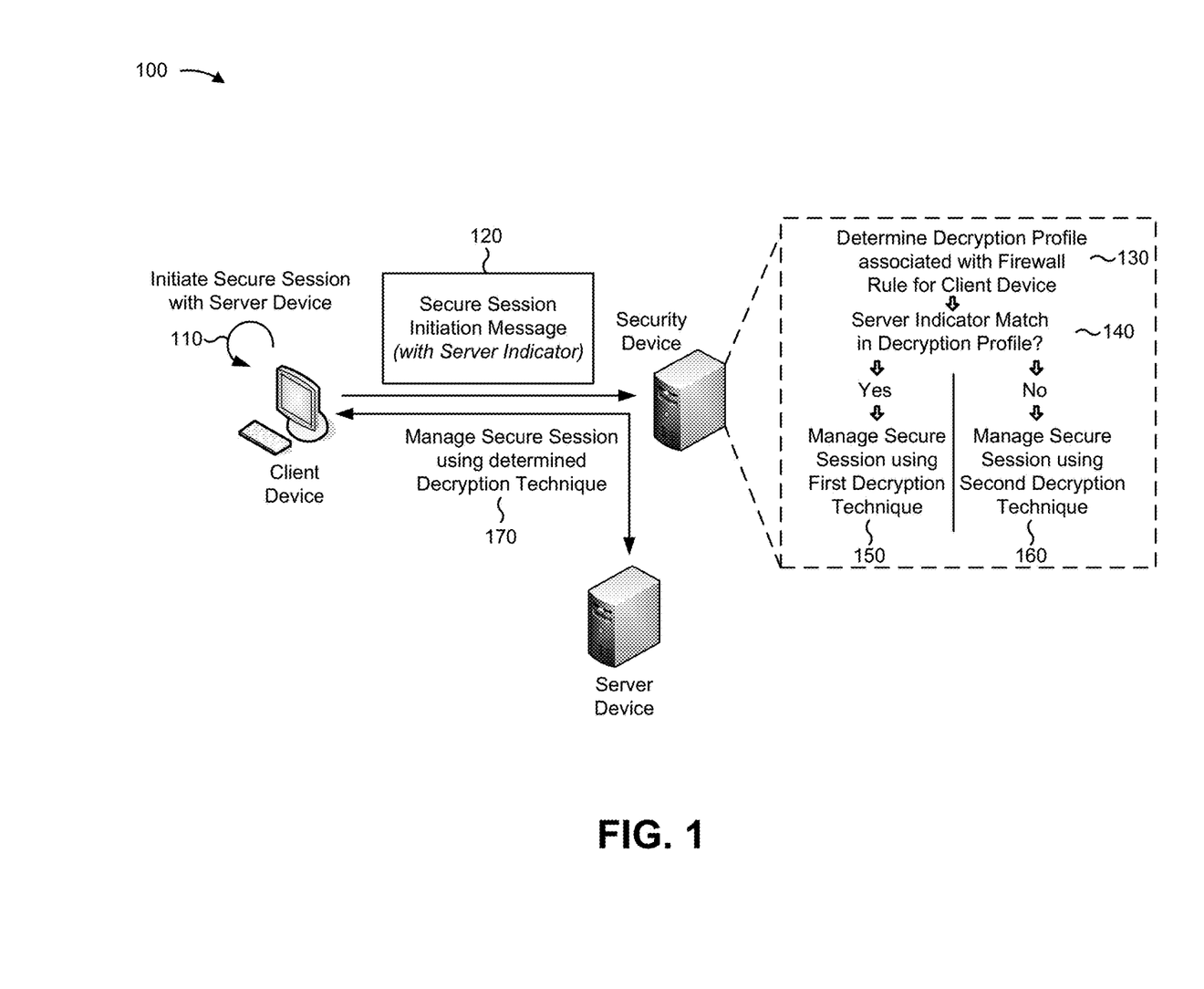
FIG. 1 is a diagram of an overview of an example implementation described herein.

FIG. 1 is a diagram of an overview of an example implementation 100 described herein. For the purposes of example implementation 100, assume that a security device is positioned between a client device and a server device, and that the security device hosts a firewall associated with managing, inspecting, processing, monitoring, or the like, traffic provided by and/or destined for a client device.

As shown in FIG. 1, and by reference number 110, the client device may receive an indication to initiate a secure session with the server device. As shown by reference number 120, the client device may initiate a handshake, associated with establishing the secure session, by sending a message (e.g., a client hello message associated with initiating an SSL/TLS handshake). As shown, assume that the client device is configured to include a server indicator within the message, that includes information associated with the server device, such as a host name associated with the server device, a domain identifier associated with the server device, or the like.

For the purposes of FIG. 1, assume that the security device is configured to inspect traffic provided by the client device, and analyze messages associated with initiating secure sessions provided by the client device. As shown by reference number 130, the security device may, based on information included in a packet associated with the message, match a firewall rule for managing traffic associated with the client device, and may identify a decryption profile with which the firewall rule is associated. In some implementations, the decryption profile may include a set of server certificates and corresponding private keys (e.g., the private keys may be stored by the security device and/or by another device that allows the security device to access the private keys). As shown by reference number 140, the security device may determine, based on the information associated with the server device, whether the decryption profile indicates that the security device stores or has access to a certificate and a server private key associated with the server device. In a case where the security device stores or has access to a certificate and a corresponding server private key, the security device may be capable of decrypting an encrypted master key that has been encrypted with a server public key associated with the server private key. Conversely, in a case where the security device does not store or have access to a certificate and a corresponding server private key, the security device may not be capable of decrypting the encrypted master key.

As shown by reference number 150, if the security device stores or has access to a certificate and a corresponding server private key associated with the server device, then the security device may determine that the security device is to manage encrypted traffic, associated with the secure session, using a first decryption technique. For example, since the security device may be capable of decrypting the master key using the server private key, the security device may determine that the security device is to use the SSL inbound inspection technique to manage the encrypted traffic.

Conversely, as shown by reference number 160, if the security device does not store or have access to a certificate and/or a corresponding private key associated with the server device, then the security device may determine that the security device is to manage the encrypted traffic, associated with the secure session, using a second decryption technique. For example, since the security device may not be capable of decrypting the master key, the security device may determine that the security device is to use the SSL forward proxy technique to manage the encrypted traffic. Similarly, if the security device determines that the message does not include a server indicator and the security device is unable to ascertain information associated with the server device in another manner (e.g., via a reverse DNS lookup, based on an IP address, etc.), then the security device may determine that the security device is to manage the traffic associated with the secure session using the second decryption technique. As shown by reference number 170, the security device may proceed with managing the encrypted traffic using the determined decryption technique.

In this way, a security device may dynamically identify a decryption technique to be used to manage encrypted traffic associated with a secure session. As such, a single decryption profile, associated with managing encrypted traffic, may be used to implement multiple, different decryption techniques, which may lead to simplified configuration of the security device. Moreover, the ability to dynamically identify the decryption technique may improve efficiency in terms of computing resources consumed by the security device.

Notably, while systems and/or methods described herein may be described in the context of using the SSL forward proxy technique or the SSL inbound inspection technique, in some implementations, one or more other decryption techniques may be used. For example, the systems and/or methods described herein may be applied to a set of decryption techniques that includes a first decryption technique that may be implemented when the security device stores or has access to a server certificate and a server private key, and a second decrypting technique that may be implemented when the security device does not store or have access to a server certificate and/or a server private key. Additionally, the system and/or methods described herein may also be applicable to another type of protocol that uses an extension associated with upgrading a plain text session to an encrypt session, and transforming the plain text session to an SSL/TLS session after exchanging data on the existing plain text session, such as a STARTTLS extension.

Additionally, while the systems and/or methods described herein may be described in the context of a SSL/TLS session, in some implementations, the systems and/or methods may be used in association with another type of secure session via which traffic, encrypted with a master key, is sent and/or received by a client device and/or a server device.

Figure 2:
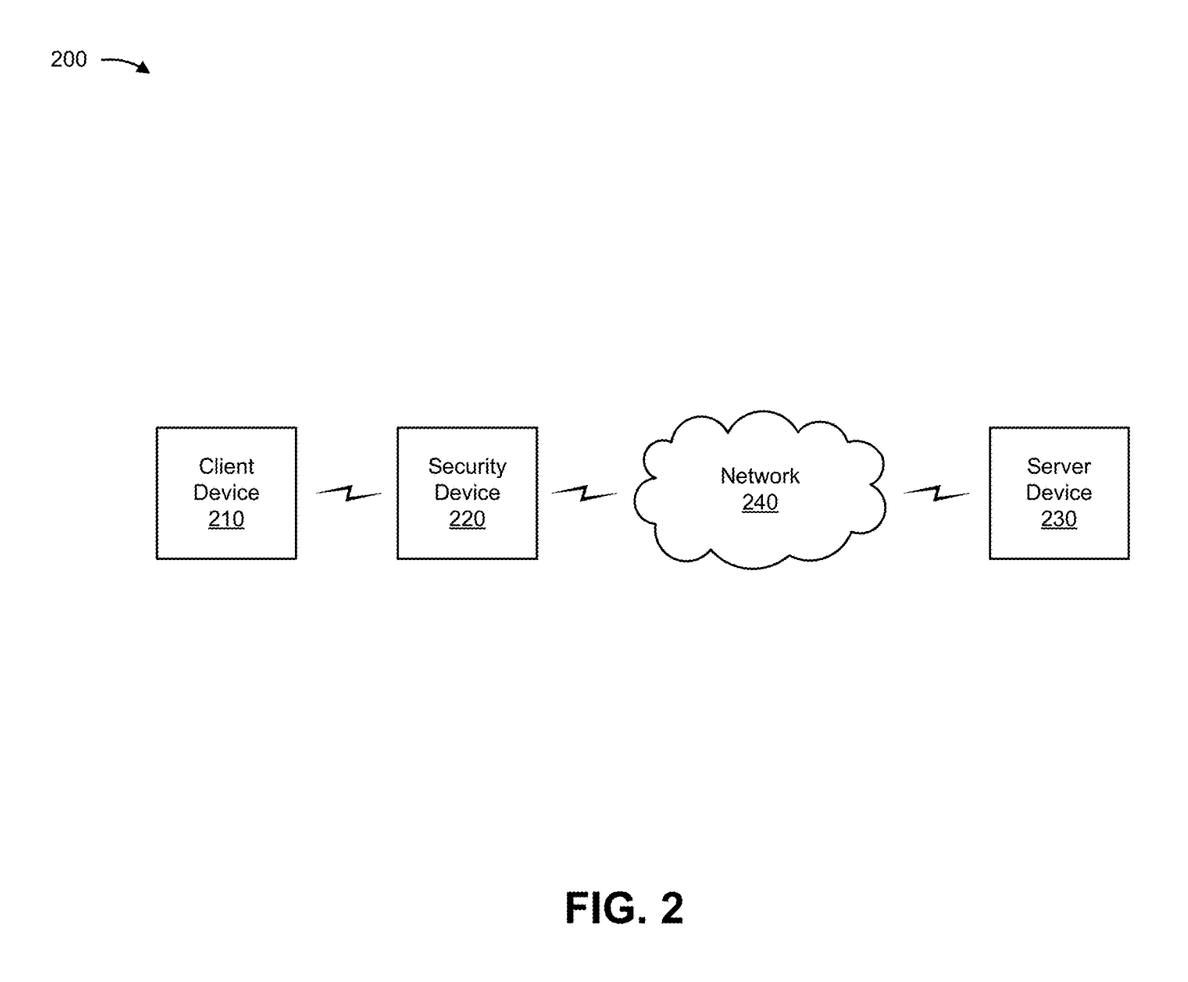
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a security device 220, a server device 230, and a network 240. Devices of environment 200 may interconnect via wired connections, wireless connections, or a combination of wired and wireless connections.

Client device 210 may include one or more devices capable of communicating with other devices, such as security device 220 and/or server device 230, via network 240. For example, client device 210 may include a computing device, such as a laptop computer, a tablet computer, a handheld computer, a desktop computer, a mobile phone (e.g., a smart phone, a radiotelephone, etc.), or a similar device. In some implementations, client device 210 may be capable of initiating a secure session with server device 230, such as a SSL/TLS session.

Security device 220 may include one or more devices capable of managing, inspecting, processing, and/or monitoring, traffic provided by and/or destined for client device 210 and associated with a secure session between client device 210 and another device, such as a SSL/TLS session between client device 210 and server device 230. For example, security device 220 may include a computing device, such as a server device or a group of server devices. Additionally, or alternatively, security device 220 may be implemented within a cloud computing network using one or more virtual machines. In some implementations, security device 220 may host a firewall associated with client device 210 and/or may store or have access to a decryption profile associated with one or more firewall rules corresponding to the firewall.

In some implementations, security device 220 may be capable of using multiple, different decryption techniques to manage encrypted traffic associated with the secure session, such as a SSL forward proxy technique, a SSL inbound inspection technique, or the like. Additionally, or alternatively, security device 220 may store or have access to a decryption profile associated with determining a decryption technique to be used to manage the encrypted traffic.

In some implementations, security device 220 may include one or more devices capable of processing and/or transferring traffic associated with client device 210. For example, security device 220 may include a network device, such as a reverse proxy, a server (e.g., a proxy server), a traffic transfer device, a router, a load balancer, or the like.

In some implementations, security device 220 may be used in connection with a single client device 210 or a group of client devices 210 (e.g., included in a client network). Communications may be routed through security device 220 to reach client device(s) 210. For example, security device 220 may be positioned within a network as a gateway to a client network that includes one or more client devices 210. In some implementations, security device 220 may be used in connection with a single server device 230 or a group of server devices 230 (e.g., a data center). Communications may be routed through security device 220 to reach the one or more server devices 230. For example, security device 220 may be positioned within a network as a gateway to a private network that includes one or more server devices 230.

Server device 230 may include one or more devices capable of receiving, generating, storing, and/or providing traffic to and/or from security device 220 and/or client device 210. For example, server device 230 may include a computing device, such as a server (e.g., an application server, a content server, a host server, a web server, etc.) or a collection of servers.

Network 240 may include one or more wired and/or wireless networks that allow client device 210 and/or server device 230 to communicate. For example, network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
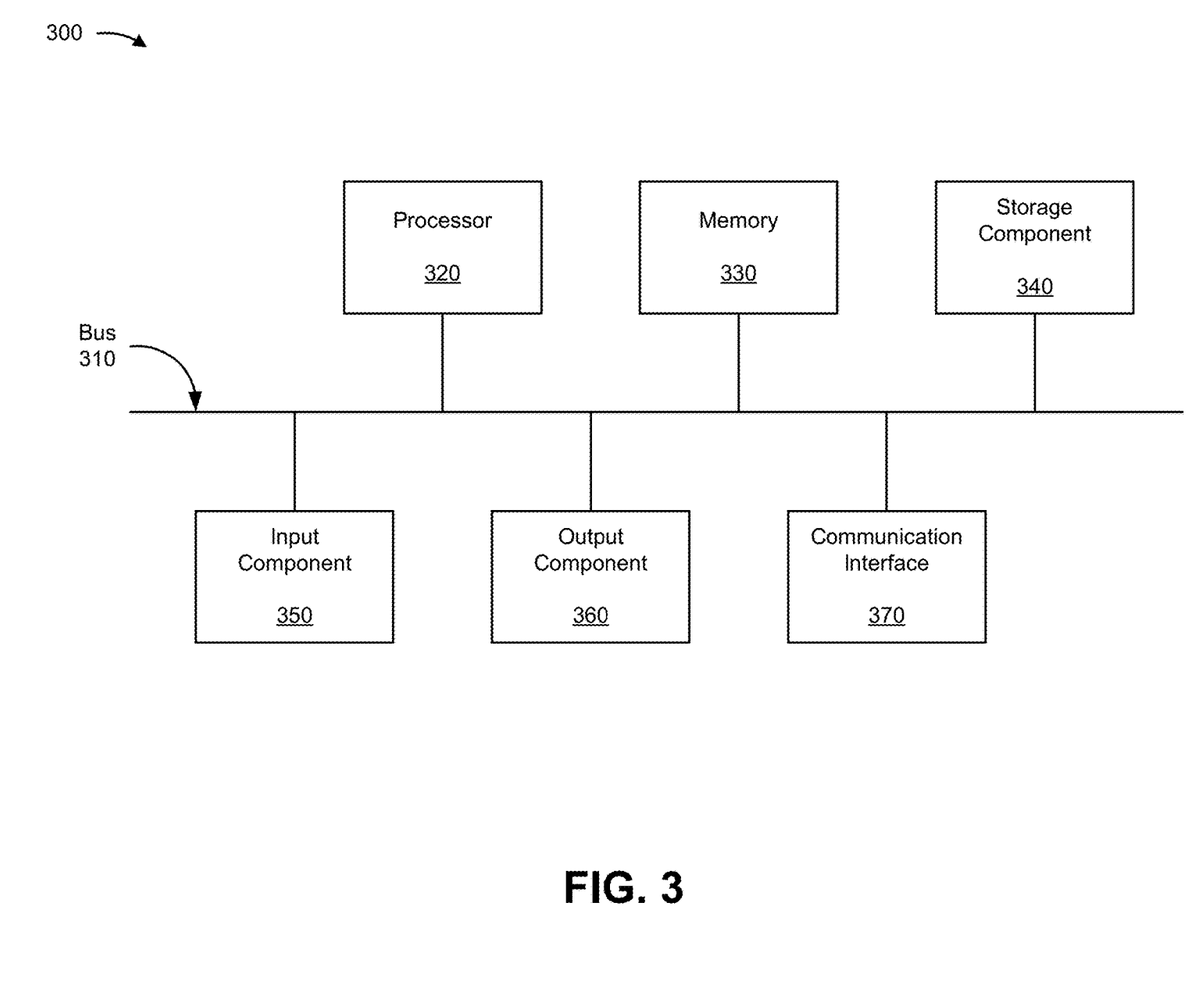
FIG. 3 is a diagram of example components of one or more devices of FIG. 2.

FIG. 3 is a diagram of example components of a device 300. Device 300 may correspond to client device 210, security device 220, and/or server device 230. In some implementations, client device 210, security device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
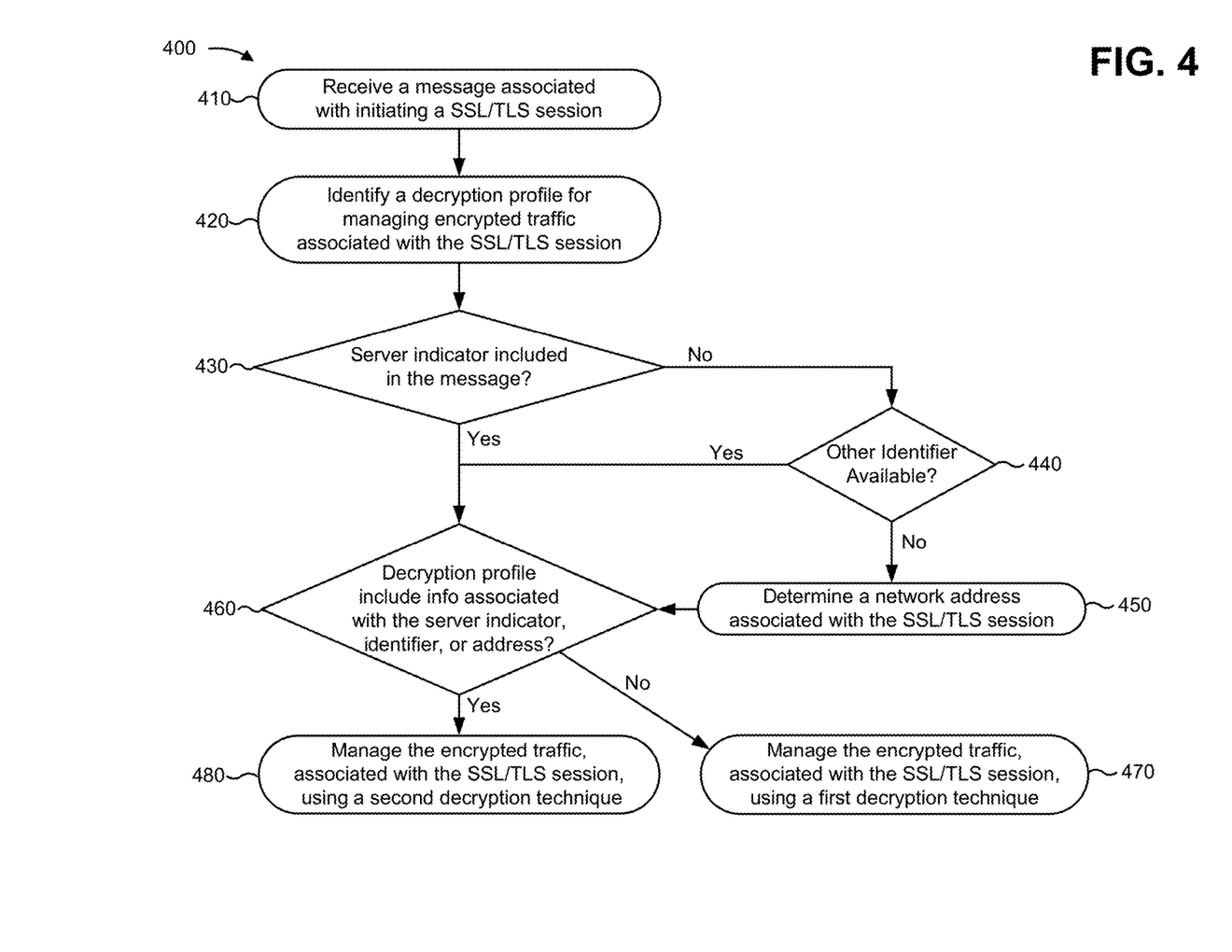
FIG. 4 is a flow chart of an example process for dynamically determining a decryption technique to be used to manage encrypted traffic associated with a secure session.

FIG. 4 is a flow chart of an example process 400 for dynamically determining a decryption technique to be used to manage encrypted traffic associated with a secure session. In some implementations, one or more process blocks of FIG. 4 may be performed by security device 220. In some implementations, one or more process blocks of FIG. 4 may be performed by another device or a group of devices separate from or including security device 220, such as client device 210.

As shown in FIG. 4, process 400 may include receiving a message associated with initiating a SSL/TLS session (block 410). For example, security device 220 may receive a message associated with initiating a SSL/TLS session. In some implementations, security device 220 may receive the message when another device provides the message, such as when client device 210 provides the message.

The message may include a message associated with initiating a SSL/TLS session such that client device 210 and server device 230 may exchange encrypted information. For example, the message may include a client hello message associated with initiating the SSL/TLS session between client device 210 and server device 230. In some implementations, client device 210 may provide the client hello message at the beginning of the SSL/TLS session or in response to a STARTTLS message associated with transforming an existing session to an SSL/TLS session. In some implementations, the message may include a server indicator associated with server device 230. For example, if the message is a client hello message that conforms with transport layer security (TLS) 1.0 standard or higher, the message may include a server name indication (SNI) extension that includes that identifies server device 230, such as a host name associated with server device 230, a domain name associated with server device 230, or the like.

In some implementations, the message may conform to TLS 1.0, TLS 1.1, TLS 1.2, or the like, and, therefore, may include the server indicator in the form of a server name indication (SNI) extension included in the message. Alternatively, the message may conform to SSL v2.0, SSL v3.0, or the like, and, therefore, may not include the server indicator (e.g., since the SNI extension is not included in messages that conform with SSL v2.0, SSL v3.0, etc.). In some implementations, security device 220 may determine a decryption technique that is to be used to manage encrypted traffic, associated with the SSL/TLS session, based on the server indicator, in the manner described below. In some implementations, determining the decryption technique based on the server indicator may allow security device 220 to dynamically determine the decryption technique (e.g., rather than requiring the decryption profile to explicitly identify the decryption technique). Moreover, as described below, determining the decryption technique based on the server indicator (e.g., rather than a destination Internet protocol (IP) address) may allow the decryption technique to be dynamically determined even in a virtual hosting and/or domain name system (DNS) round robin scenario where the destination IP address may change. Additionally, or alternatively, the message may include other information associated with initiating the secure session.

In some implementations, security device 220 may receive the message based on inspecting a packet associated with the message. For example, security device 220 may be positioned between client device 210 and network 240, and may be configured to inspect (e.g., using a deep packet inspection (DPI) technique) packets provided by client device 210. Here, security device 220 may, based on inspecting a packet associated with the message, determine that the packet includes the message, and security device 220 may analyze the message when, for example, security device 220 is configured to analyze messages associated with initiating secure sessions.

Additionally, or alternatively, security device 220 may receive and/or determine information for identifying a firewall rule (and an associated decryption profile) that is to be used to manage traffic associated with the secure session. For example, security device 220 may receive and/or determine (e.g., based on the packet associated with the message) a source IP address, a destination IP address, a source port, a destination port, a transport layer protocol, or the like, and may use some or all of this information to identify a decryption profile associated with the SSL/TLS session, as described below.

As further shown in FIG. 4, process 400 may include identifying a decryption profile for managing encrypted traffic associated with the SSL/TLS session (block 420). For example, security device 220 may identify a decryption profile for managing encrypted traffic associated with the SSL/TLS session to be initiated based on the message received by security device 220. In some implementations, security device 220 may identify the decryption profile after security device 220 receives the message. Additionally, or alternatively, security device 220 may identify the decryption profile after security device 220 identifies a firewall rule, as described below.

The decryption profile may include information associated with managing, inspecting, processing, and/or monitoring encrypted traffic associated with a secure session. For example, the decryption profile may include information associated with decrypting encrypted traffic. For example, the decryption profile may include a list of server certificates and corresponding private keys associated with one or more server devices 230. As another example, the decryption profile may include, a list of destination network addresses and corresponding private keys associated with one or more server devices 230. As still another example, the decryption profile may include a list of exempted network addresses, exempted host names, exempted uniform resource locator (URL) categories, associated with one or more server devices 230 for which traffic is not to be decrypted. As yet another example, the decryption profile may include one or more certificates and corresponding private keys that allow security device 220 to act as signing authority. As an additional example, the decryption profile may include information that identifies an action to be taken when security device 220 does not support SSL options being negotiated in association with establishing the SSL/TLS session, or the like. In some implementations, the information included in the decrtyption profile may be used to determine the decryption technique to be used to manage the encrypted traffic, as described below.

Additionally, or alternatively, the decryption profile may include information that identifies a set of trusted certificate authorities (e.g., for server device 230 certificate validation). Additionally, or alternatively, the decryption profile may include information associated with one or more other options associated with managing traffic associated with a secure session, such as an option to drop or allow a SSL/TLS session when non-supported SSL traffic is detected, when an anomaly is detected, or the like.

In some implementations, the decryption profile may be associated with one or more firewall rules. In other words, multiple firewall rules may use a single decryption profile. Notably, in some implementations, the decryption profile may not include information that identifies a particular decryption technique to be used when applying the decryption profile. Instead, security device 220 may determine a decryption technique to be used when managing the encrypted traffic, as described below. As such, configuration of the decryption profile and/or security device 220 may be simplified (e.g., since the decryption technique need not be explicitly identified).

In some implementations, security device 220 may identify the decryption profile for managing the traffic, associated with the secure session, based on identifying a firewall rule. For example, as described above, assume that security device 220 determines, based on a packet associated with the message, a source IP address, a destination IP address, a source port, a destination port, a transport layer protocol, or the like. Here, security device 220 may, based on one or more of these items of information, identify a firewall rule to be applied when managing, inspecting, processing, and/or monitoring traffic associated with client device 210. In this example, security device 220 may also store information that identifies a decryption profile with which the firewall rule is associated, and security device 220 may identify the decryption profile as the decryption profile corresponding to the firewall rule.

As further shown in FIG. 4, process 400 may include determining whether the message includes a server indicator (block 430). For example, security device 220 may determine whether the message includes a server indicator. In some implementations, security device 220 may determine whether the message includes the server indicator after security device 220 determines the decryption profile for managing the traffic associated with the secure session. Additionally, or alternatively, security device 220 may determine whether the message includes a server indicator after security device 220 receives the message associated with initiating the secure session.

In some implementations, security device 220 may determine whether the message includes the server indicator based on inspecting the message. For example, security device 220 may receive the client hello message associated with initiating a SSL/TLS session, and may inspect the client hello message to determine whether the client hello message includes a SNI extension associated with the SSL/TLS session. In some implementations, whether the message includes the server indicator may depend on a protocol to which the message conforms, as described above. For example, as described above, if the message conforms to TLS 1.0, TLS, 1.1, TLS 1.2, or the like, then the message may include a SNI extension. As another example, if the message conforms to SSL v2.0, SSL v3.0, or the like, then the message may not include a SNI extension.

As further shown in FIG. 4, if the message does not include a server indicator (block 430—NO), then process 400 may include determining whether another identifier, associated with the SSL/TLS session, is available (block 440). For example, security device 220 may determine whether another identifier, associated with the SSL/TLS session, is available.

The other identifier may include information associated with server device 230 with which the SSL/TLS session, associated with the message, is to be established. For example, the other identifier may include a hostname associated with server device 230, a domain name associated with server device 230, or the like.

In some implementations, security device 220 may determine whether the other identifier is available based on a network address associated with the message. For example, security device 220 may determine a destination IP address, associated with the message, based on the packet associated with the message. Here, security device 220 may query a DNS server with the destination IP address in order to cause the DNS server to perform a reverse DNS lookup based on the destination IP address. In this example, security device 220 may determine whether the other identifier is available based on a response to the query. For example, security device 220 may determine that the other identifier is available when the DNS server provides a hostname, corresponding to the destination IP address and identified based on the reverse DNS lookup, in response to the query. As another example, security device 220 may determine that the other identifier is not available when the DNS server provides an indication that the DNS server does not store or have access to a hostname corresponding to the destination IP address. In some implementations, security device 220 may determine whether the other identifier is available using a different technique and/or based on communicating with another device.

As further shown in FIG. 4, if the other identifier is not available (block 440—NO), then process 400 may include determining a network address associated with the SSL/TLS session (block 450). For example, security device 220 may determine that the other identifier is not available, and may determine a network address associated with the SSL/TLS session. As described above, security device 220 may determine the network address, such as a destination IP address, based on inspecting the packet associated with the message.

As further shown in FIG. 4, if the message includes a server indicator (block 430—YES), if the other identifier is available (block 440—YES), or after determining the network address associated with the SSL/TLS session (block 460), then process 400 may include determining whether the decryption profile includes information associated with the server indicator, the other identifier, or the network address (block 450). For example, security device 220 may determine that the message includes a server indicator, and security device 220 may determine whether the decryption profile includes information associated with the server indicator. As another example, security device 220 may determine that the other identifier (e.g., a hostname, a domain name, etc.), associated with server device 230, is available, and security device 220 may determine whether the decryption profile includes information associated with the other identifier. As still another example, security device 220 may determine the network address associated with the SSL/TLS session, and security device 220 may determine whether the decryption profile includes information associated with the network address.

In some implementations, security device 220 may determine whether the decryption profile includes information associated with the server indicator, the other identifier, or the network address based on information included in the decryption profile. For example, security device 220 may determine whether the decryption profile includes a server certificate and a corresponding private key that correspond to the information included in the SNI extension, the hostname, or the network address.

In some implementations, security device 220 may determine whether the decryption profile includes the information associated with the server indicator, the hostname, or the network address by performing a lookup, using the server indicator, the hostname, or the network address in one or more information fields associated with the decryption profile, such as a subject field, an alternative subject field, or the like. For example, when the server indicator includes a domain name (e.g., a fully qualified domain name that specifies an exact location in a DNS hierarchy), security device 220 may perform the lookup using the domain name to determine whether the decryption profile includes the information associated with the server indicator. As another example, when security device 220 determines a hostname (e.g., based on a reverse DNS lookup when no SNI is included in the message), security device 220 may perform the lookup using the hostname to determine whether the decryption profile includes the information associated with the hostname. As an additional example, when security device 220 determines a destination IP address (e.g., when the message does not include a SNI, when security device 220 determines that the other identifier is not available, etc.), security device 220 may perform the lookup using the destination IP address to determine whether the decryption profile includes the information associated with the destination IP address. In some implementations, security device 220 may perform the lookup using one or more of the server indicator, the other identifier, and the network address.

As further shown in FIG. 4, if the decryption profile does not include information associated with the server indicator, the other identifier, or the network address (block 460—NO), then process 400 may include managing the encrypted traffic, associated with the SSL/TLS session, using a first decryption technique (block 470). For example, security device 220 may determine that the decryption profile does not include information associated with the server indicator, the other identifier, and/or the network address, and security device 220 may manage the encrypted traffic, associated with the SSL/TLS session, using a first decryption technique.

In some implementations, the first decryption technique may include a decryption technique to be used to manage encrypted traffic when security device 220 does not store or have access to a server certificate and/or a corresponding server private key, and/or when the message, associated with initiating the SSL/TLS session, does not include a server indicator. In other words, the first decryption technique may include a decryption technique to be used when security device 220 is not capable of determining a master key, associated with the SSL/TLS session, based on information stored or accessible by security device 220. For example, the first decryption technique may include the SSL forward proxy technique that causes security device 220 to act as a man-in-the-middle of client device 210 and server device 230 such that security device 220 may be capable of determining a master key, associated with the SSL/TLS session, as described above. In some implementations, use of the first decryption technique may consume more computing resources than a second decryption technique (e.g., the SSL inbound inspection technique). As such, it may be desirable to implement the second decryption technique when possible.

As further shown in FIG. 4, if the decryption profile includes information associated with the server indicator, the other identifier, or the network address (block 460—YES), then process 400 may include managing the encrypted traffic, associated with the SSL/TLS session, using a second decryption technique (block 480). For example, security device 220 may determine that the decryption profile includes information associated with the server indicator, the other identifier, or the network address, and security device 220 may manage the encrypted traffic, associated with the SSL/TLS session, using the second decryption technique.

In some implementations, the second decryption technique may include a decryption technique to be used to manage encrypted traffic when security device 220 stores or has access to a server certificate and a corresponding server private key associated with server device 230. In other words, the second decryption technique may include a decryption technique to be used when security device 220 is capable of determining a master key, associated with the SSL/TLS session, based on information stored or accessible by security device 220. For example, the second decryption technique may include the SSL inbound inspection technique that causes security device 220 to decrypt and inspect traffic without acting as a man-in-the-middle between client device 210 and server device 230, as described above.

Due to the nature of implementing the SSL inbound inspection technique (e.g., rather than splitting the SSL/TLS session in two by establishing and/or maintaining a SSL/TLS session with client device 210 and a SSL/TLS session with server device 230), an amount of computing resources, consumed by security device 220 implementing the SSL inbound inspection technique, may be less than an amount of computing resources consumed by security device 220 when implementing the SSL forward proxy technique. As such, it may be desirable to implement the second decryption technique when possible. Moreover, since the decryption technique need not be explicitly configured, an amount of computing resources consumed by security device 220 may be reduced by allowing security device 220 to dynamically determine and implement the SSL inbound inspection technique.

In this way, security device 220 may dynamically determine a decryption technique to be used to manage traffic associated with a SSL/TLS session. As such, a single decryption profile, associated with the managing encrypted traffic for SSL/TLS sessions, may be used to implement multiple, different decryption techniques (e.g., since the decryption technique need not explicitly identify the decryption technique). This may lead to simplified configuration of security device 220 and/or increased efficiency in resource consumption by security device 220.

Moreover, in a case where a new server device 230 is provisioned and a server certificate and/or a corresponding server private key are not yet available to security device 220, security device 220 may, based on implementing process 400, automatically implement the first decryption technique without additional configuration of security device 220. As such, an explicit action by a user of security device 220 (e.g., associated with identifying a decryption technique for new server device 230) may not be needed when the new server device 230 is provisioned.

Additionally, based on implementing process 400, security device 220 may be capable of determining a decryption technique to be used in a DNS round robin scenario. For example, since security device 220 determines which decryption technique is to be used based on the server indicator, a DNS round robin scenario that causes multiple, different IP addresses to be associated with a server indicator may not prevent security device 220 from determining which decryption technique to use to manage the encrypted traffic, since the different IP addresses may not affect the determination of the decryption technique.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
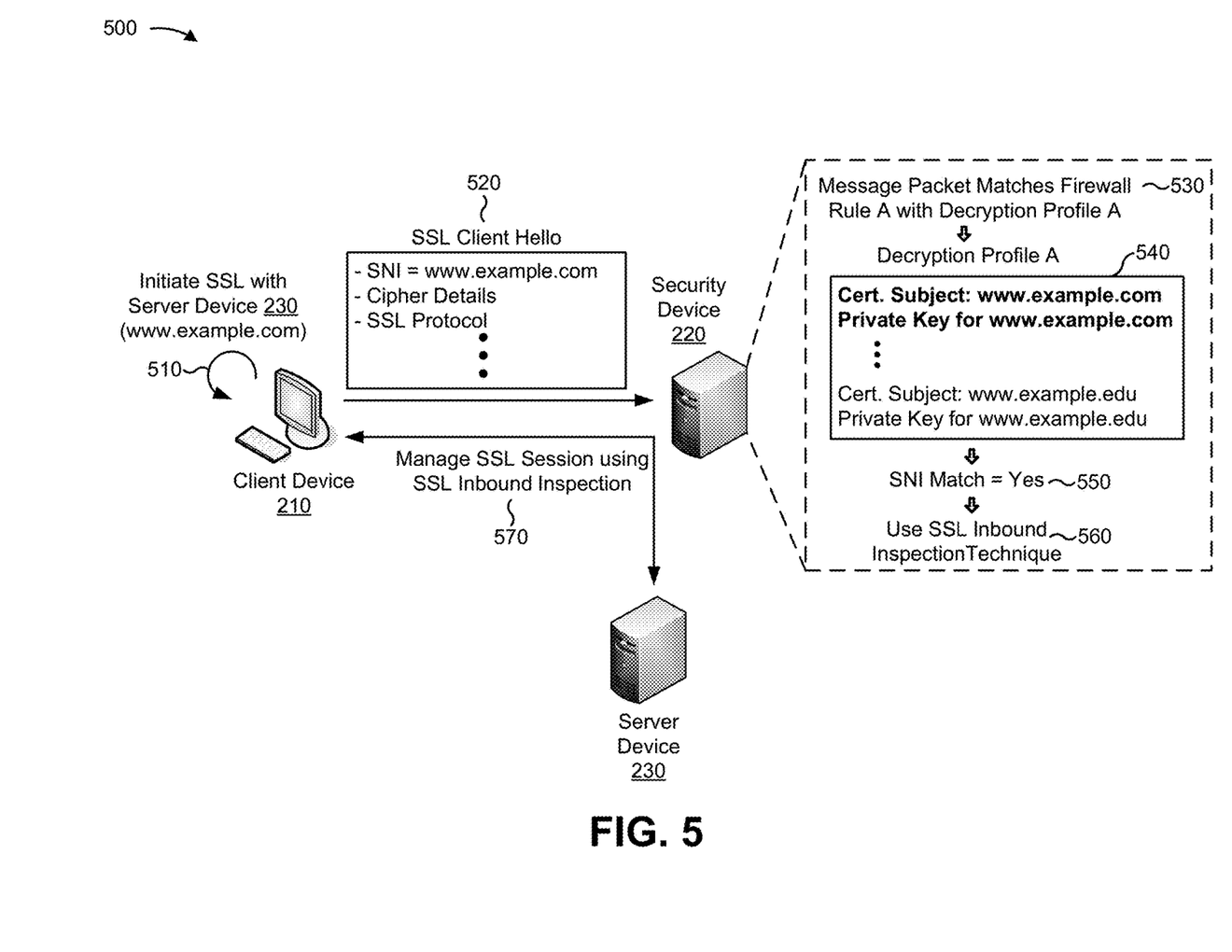
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that security device 220 stores or has access to a set of firewall rules associated with client device 210, and one or more decryption profiles associated with the set of firewall rules.

As shown in FIG. 5, and by reference number 510, client device 210 may receive (e.g., based on user input) an indication to initiate a SSL/TLS session with server device 230. As shown by reference number 520, as part of an SSL/TLS handshake, client device 210 may provide, to security device 220, a client hello message associated with initiating the SSL/TLS session. As shown, the client hello message may include a SNI associated with server device 230 (e.g., www.example.com) with which the SSL/TLS session is to be established, along with other information associated with establishing the SSL/TLS session (e.g., cipher details, SSL protocol details, etc.).

For the purposes of example implementation 500, assume that security device 220 is configured to inspect packets provided by client device 210, and analyze messages associated with initiating SSL/TLS sessions such that security device 220 may determine a decryption technique to use to manage encrypted traffic associated with the SSL/TLS session. As shown by reference number 530, based on inspecting the packet associated with the SSL client hello message, security device 220 may determine that a particular firewall rule (e.g., firewall rule A) is to be applied to traffic associated with client device 210. As shown, security device 220 may then determine (e.g., based on information stored or accessible by security device 220) a decryption profile (e.g., decryption profile A) for managing encrypted traffic, associated with the SSL/TLS session, with which the firewall rule is associated.

As shown by reference number 540, the decryption profile may include a list of server certificates and corresponding private keys. For example, as shown, the decryption profile may include a first entry associated with a first hostname (e.g., www.example.com), for which a first server certificate, and a corresponding first server private key are stored, an entry associated with a second hostname (e.g., www.example.edu), for which a second server certificate, and a corresponding second server private key are stored, and the like. As shown by reference number 550, security device 220 may determine, based on the decryption profile and the SNI included in the client hello message, that the decryption profile includes a server certificate and a corresponding private key for associated with the hostname (e.g., since the hostname associated with the first entry matches the SNI included in the client hello message).

As shown by reference number 560, based on determining that the decryption profile includes the information associated with the SNI included in the client hello message, security device 220 may determine that security device 220 is to use the SSL inbound inspection technique when managing the encrypted traffic associated with the SSL/TLS session between client device 210 and server device 230. As shown by reference number 570, security device 220 may then manage the traffic associated with the SSL/TLS session using the SSL inbound inspection technique, accordingly. In other words, security device 220 may determine a master key, associated with the session, based on the private server key corresponding to the SNI, and may decrypt the encrypted traffic, accordingly.

As indicated above, FIG. 5 is provided merely as an example. Other examples are possible and may differ from what was described with regard to FIG. 5.

Figure 6:
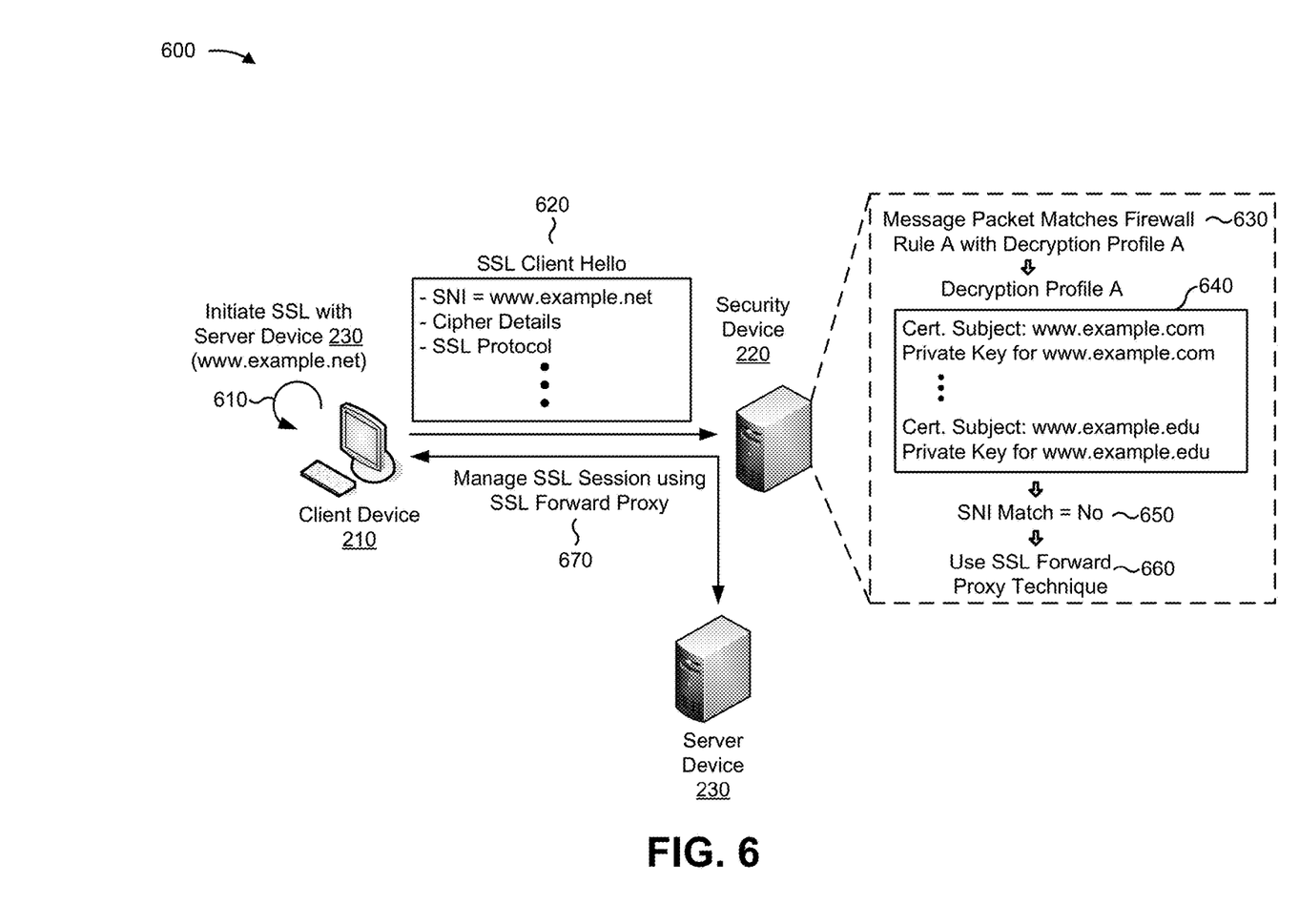
FIG. 6 is a diagram of an additional example implementation relating to the example process shown in FIG. 4.

FIG. 6 is a diagram of an additional example implementation 600 relating to example process 400 shown in FIG. 4. For the purposes of example implementation 600, assume that security device 220 stores or has access to a set of firewall rules associated with client device 210, and one or more decryption profiles associated with the set of firewall rules.

As shown in FIG. 6, and by reference number 610, client device 210 may receive (e.g., based on user input) an indication to initiate a SSL/TLS session with server device 230. As shown by reference number 620, as part of an SSL/TLS handshake, client device 210 may provide, to security device 220, a client hello message associated with initiating the SSL/TLS session. As shown, the client hello message may include a SNI associated with server device 230 (e.g., www.example.net) with which the SSL/TLS session is to be established, along with other information associated with establishing the SSL/TLS session (e.g., cipher details, SSL protocol details, etc.).

For the purposes of example implementation 600, assume that security device 220 is configured to inspect packets provided by client device 210, and analyze messages associated with initiating SSL/TLS sessions such that security device 220 may determine a decryption technique to use to manage encrypted traffic associated with the SSL/TLS session. As shown by reference number 630, based on inspecting the packet associated with the SSL client hello message, security device 220 may determine that a particular firewall rule (e.g., firewall rule A) is to be applied to traffic associated with client device 210. As shown, security device 220 may then determine (e.g., based on information stored or accessible by security device 220) a decryption profile (e.g., decryption profile A) for managing encrypted traffic, associated with the SSL/TLS session, with which the firewall rule is associated.

As shown by reference number 640, the decryption profile may include a list of server certificates and corresponding private keys. For example, as shown, the decryption profile may include a first entry associated with a first hostname (e.g., www.example.com), for which a first server certificate, and a corresponding first server private key are stored, an entry associated with a second hostname (e.g., www.example.edu), for which a second server certificate, and a corresponding second server private key are stored, and the like. As shown by reference number 650, security device 220 may determine, based on the decryption profile and the SNI included in the client hello message, that the decryption profile does not include information associated with the hostname (e.g., since no entry in the decryption profile matches the hostname included in the client hello message).

As shown by reference number 660, based on determining that the decryption profile does not include information associated with the SNI included in the client hello message, security device 220 may determine that security device 220 is to use the SSL forward proxy technique when managing the encrypted traffic associated with the SSL/TLS session between client device 210 and server device 230. As shown by reference number 670, security device 220 may then manage the traffic associated with the SSL/TLS session using the SSL forward proxy technique, accordingly. In other words, security device 220 may determine a master key, associated with the session, by replacing a public key, associated with the server device and in the server certificate, with a public key associated with security device 220 (herein referred to as a security device public key), and sending the server certificate that includes the security device public key to client device 210. Here, when client device 210 sends a master key encrypted with the security device public key, security device 220 may be able to decrypt the encrypted master key using a private key corresponding to the security device public key. Security device 220 may then decrypt the encrypted traffic using the master key, as described above, after acting as a man-in-the-middle such that two SSL/TLS sessions are established (e.g., a first SSL/TLS session with client device 210 and a second SSL/TLS session with server device 230).

As indicated above, FIG. 6 is provided merely as an example. Other examples are possible and may differ from what was described with regard to FIG. 6.

Figure 7:
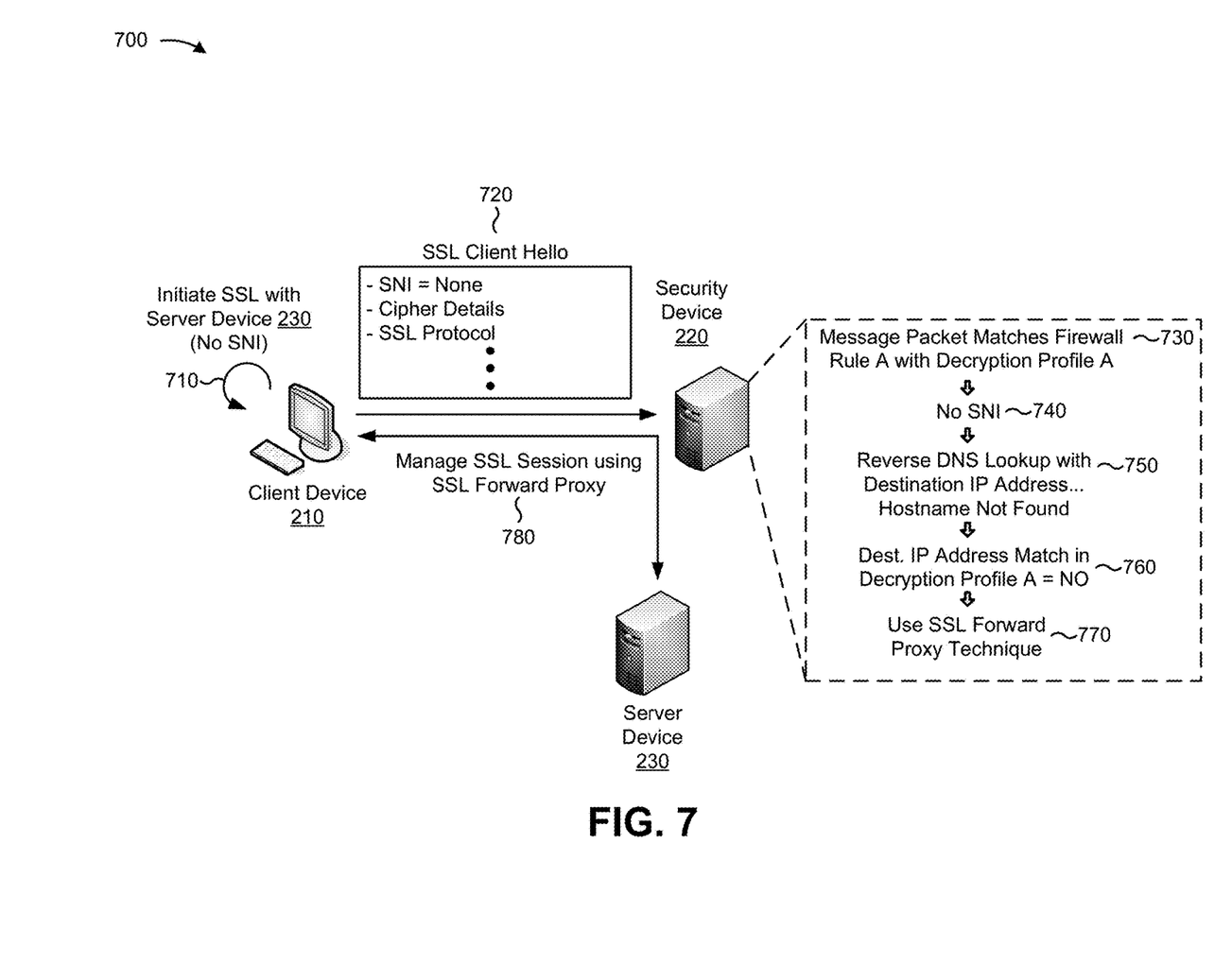
FIG. 7 is a diagram of another example implementation relating to the example process shown in FIG. 4.

FIG. 7 is a diagram of another example implementation 700 relating to example process 400 shown in FIG. 4. For the purposes of example implementation 700, assume that security device 220 stores or has access to a set of firewall rules associated with client device 210, and one or more decryption profiles associated with the set of firewall rules.

As shown in FIG. 7, and by reference number 710, client device 210 may receive (e.g., based on user input) an indication to initiate a SSL/TLS session with server device 230. As shown by reference number 720, as part of an SSL/TLS handshake, client device 210 may provide, to security device 220, a client hello message associated with initiating the SSL/TLS session. As shown, the client hello message may not include a SNI associated with server device 230 with which the SSL/TLS session is to be established, but may include other information associated with establishing the SSL/TLS session (e.g., cipher details, SSL protocol details, etc.).

For the purposes of example implementation 700, assume that security device 220 is configured to inspect packets provided by client device 210, and analyze messages associated with initiating SSL/TLS sessions such that security device 220 may determine a decryption technique to use to manage encrypted traffic associated with the SSL/TLS session. As shown by reference number 730, based on inspecting the packet associated with the SSL client hello message, security device 220 may determine that a particular firewall rule (e.g., firewall rule A) is to be applied to traffic associated with client device 210. As shown, security device 220 may then determine (e.g., based on information stored or accessible by security device 220) a decryption profile (e.g., decryption profile A) for managing encrypted traffic, associated with the SSL/TLS session, with which the firewall rule is associated.

As shown by reference number 740, security device 220 may determine that the client hello message does not include a SNI. As shown by reference number 750, based on determining that the decryption profile does not include a SNI associated with server device 230, security device 220 may query a DNS server (not shown) using a destination IP address (e.g., determined based on inspecting the packet associated with the client hello message) in order to determine whether another identifier (e.g., a hostname, a domain name), associated with server device 230, is available. Here, assume that security device 220 determines, based on a respond to the query, that no other identifier is available.

As shown by reference number 760, security device 220 may then determine, based on the decryption profile and the destination IP address, that the decryption profile does not include information associated with the destination IP address (e.g., assume that no entry in the decryption profile matches the destination IP address associated with the packet).

As shown by reference number 770, security device 220 may determine that security device 220 is to use the SSL forward proxy technique when managing the encrypted traffic for the SSL/TLS session between client device 210 and server device 230 (e.g., since security device 220 does not have access to a server private key to decrypt an encrypted master key provided by client device 210). As shown by reference number 780, security device 220 may then manage the traffic associated with the SSL/TLS session using the SSL forward proxy technique, accordingly. In other words, security device 220 may determine a master key, associated with the session, by replacing a public key, associated with the server device and in the server certificate, with a public key associated with security device 220 (herein referred to as a security device public key), and sending the server certificate that includes the security device public key to client device 210. Here, when client device 210 sends a master key encrypted with the security device public key, security device 220 may be able to decrypt the encrypted master key using a private key corresponding to the security device public key. Security device 220 may then decrypt the encrypted traffic using the master key, as described above.

As indicated above, FIG. 7 is provided merely as an example. Other examples are possible and may differ from what was described with regard to FIG. 7.

Implementations described herein may allow a security device to dynamically identify a decryption technique to be used to manage encrypted traffic associated with a secure session. In this way, a single decryption profile, associated with managing traffic, may be used to implement multiple, different decryption techniques, which may lead to simplified configuration of the security device. Moreover, the ability to dynamically identify the decryption technique may improve efficiency in terms of computing resources consumed by the security device when, for example, a less computationally expensive decryption technique may be identified for use in managing the encrypted traffic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a message associated with initiating a secure session;
    identifying, by the device, a firewall rule to be applied to encrypted traffic associated with the secure session;
    identifying, by the device, a decryption profile associated with managing encrypted traffic based on the firewall rule;

identifying, by the device, a server indicator included in the message;

determining, by the device, whether the decryption profile includes information associated with the server indicator; and selectively managing, by the device, the encrypted traffic using a first decryption technique or a second decryption technique, based on determining whether the decryption profile includes the information associated with the server indicator;

the encrypted traffic being managed using the first decryption technique when the decryption profile does not include the information associated with the server indicator;

the encrypted traffic being managed using the second decryption technique when the decryption profile includes the information associated with the server indicator;

the first decryption technique consuming a first amount of computing resources of the device;

the second decryption technique consuming a second amount of the computing resources of the device;

the second amount being less than the first amount; and selectively managing the encrypted traffic using the first decryption technique or the second decryption technique comprising:

receiving an encrypted master key from a client device; and decrypting the encrypted master key.

2. The method of claim 1, where the information associated with the server indicator includes a server certificate and a corresponding server private key.

3. The method of claim 1, where determining whether the decryption profile includes the information associated with the server indicator comprises:

determining, based on the server indicator, whether the decryption profile includes an entry that includes the information associated with the server indicator.

4. The method of claim 1, where identifying the firewall rule includes:

identifying the firewall rule associated with the message.

5. The method of claim 1, where the secure session is a secure socket layer or a transport layer security session (SSL/TLS session) and the message is a client hello message associated with initiating the SSL/TLS session.

6. The method of claim 1, where the first decryption technique is a secure socket layer (SSL) forward proxy technique.

7. The method of claim 1, where the second decryption technique is a secure socket layer (SSL) inbound inspection technique.

8. A device, comprising:

one or more processors, implemented at least partially in hardware, to:

receive a message associated with initiating a secure socket layer or a transport layer security session (SSL/TLS session);

identify a firewall rule to be applied to encrypted traffic associated with the SSL/TLS session;

identify a decryption profile associated with managing the encrypted traffic based on the firewall rule;

determine a server indicator included in the message;

determine whether the decryption profile includes information associated with the server indicator; and selectively manage the encrypted traffic associated with the SSL/TLS session using a first decryption technique or a second decryption technique, based on determining whether the decryption profile includes the information associated with the server indicator;

the encrypted traffic being managed using the first decryption technique when the decryption profile does not include the information associated with the server indicator;

the encrypted traffic being managed using the second decryption technique when the decryption profile includes the information associated with the server indicator;

the first decryption technique consuming a first amount of computing resources of the device;

the second decryption technique consuming a second amount of the computing resources of the device;

the second amount being less than the first amount; and when selectively managing the encrypted traffic using the first decryption technique or the second decryption technique, the one or more processors being to:

receive an encrypted master key from a client device; and decrypt the encrypted master key.

9. The device of claim 8, where the information associated with the server indicator includes a server certificate or a corresponding server private key.

10. The device of claim 8, where the one or more processors, when determining whether the decryption profile includes the information associated with the server indicator, are to:

perform a lookup, associated with the decryption profile and based on the server indicator, to determine whether the decryption profile includes the information associated with the server indicator.

11. The device of claim 8, where the one or more processors, when identifying the firewall rule, are to:

identify the firewall rule associated with the message.

12. The device of claim 8, where the message is a client hello message associated with initiating the SSL/TLS session.

13. The device of claim 8, where the first decryption technique is a SSL forward proxy technique and the second decryption technique is a SSL inbound inspection technique.

14. A non-transitory computer-readable medium storing instructions, the instructions comprising:

one or more instructions that, when executed by one or more processors, cause the one or more processors to:

analyze a message associated with initiating a secure socket layer or a transport layer security session (SSL/TLS session) between a client device and a server device;

identify a firewall rule to be applied to encrypted traffic associated with the SSL/TLS session;

identify a decryption profile for managing the encrypted traffic based on the firewall rule;

determine a server indicator included in the message, an identifier associated with the server device, or a network address associated with the message;

determine whether the decryption profile identifies a server certificate and a corresponding server private key associated with the server indicator, the identifier, or the network address; and manage the encrypted traffic, associated with the SSL/TLS session, using a SSL forward proxy technique when the decryption profile does not include the server certificate and the corresponding server private key;
the SSL forward proxy technique consuming a first amount of computing resources; or
manage the encrypted traffic, associated with the SSL/TLS session, using a SSL inbound inspection technique when the decryption profile includes the server certificate and the corresponding server private key;
the SSL inbound inspection technique consuming a second amount of the computing resources;
the second amount being less than the first amount; and
the one or more instructions, that cause the one or more processors to manage the encrypted traffic associated with the SSL/TLS session using the SSL forward proxy technique or the SSL inbound inspection technique, causing the one or more processors to:
receive an encrypted master key from the client device; and
decrypt the encrypted master key.

15. The non-transitory computer-readable medium of claim 14, where the one or more instructions, that cause the one or more processors to determine whether the decryption profile includes the server certificate and the corresponding server private key, cause the one or more processors to:
perform a lookup, associated with the decryption profile and based on the server indicator, the identifier, or the network address, to determine whether the decryption profile includes the server certificate and the corresponding server private key.

16. The non-transitory computer-readable medium of claim 14, where the one or more instructions, that cause the one or more processors to identify the firewall rule, cause the one or more processors to:
identify the firewall rule associated with the message.

17. The non-transitory computer-readable medium of claim 16, where the decryption profile is associated with multiple firewall rules,
the multiple firewall rules including the identified firewall rule.

18. The non-transitory computer-readable medium of claim 14, where the one or more instructions, that cause the one or more processors to manage the encrypted traffic associated with the SSL/TLS session using the SSL forward proxy technique, further cause the one or more processors to:
receive the server certificate and the corresponding server private key from the server device;
store the server certificate and a corresponding server public key; and
provide the server certificate and another public key to the client device,
the encrypted master key being encrypted using the other public key, and
the encrypted master key being decrypted based on a private key corresponding to the other public key.

19. The non-transitory computer-readable medium of claim 14, when the encrypted traffic associated with the SSL/TLS session is managed using the SSL inbound inspection technique, the encrypted master key is encrypted using a server public key corresponding to the server private key and the encrypted master key is decrypted based on the server private key.

20. The device of claim 11, where the decryption profile is associated with multiple firewall rules,
the multiple firewall rules including the identified firewall rule.

* * * * *